United States Patent [19]

Bell et al.

[11] 4,245,866
[45] Jan. 20, 1981

[54] LINEAR CONTROL FOR RECLINING SEAT

[75] Inventors: Robert L. Bell, Oxford; Alfred J. Fisher III, Grosse Pointe, both of Mich.

[73] Assignee: Fisher Corporation, Troy, Mich.

[21] Appl. No.: 81,676

[22] Filed: Oct. 4, 1979

[51] Int. Cl.³ ............................................ A47C 1/025
[52] U.S. Cl. .................................. 297/365; 108/146;
 248/408; 292/266; 297/367; 297/375
[58] Field of Search ................. 297/375, 363–369,
 297/361, 355; 292/266; 248/407–409; 108/146

[56] References Cited

U.S. PATENT DOCUMENTS

| 535,999 | 3/1895 | Sargent | 297/375 |
| 2,066,901 | 1/1937 | Preble | 297/363 X |
| 3,001,821 | 9/1961 | Marechal | 297/366 |

FOREIGN PATENT DOCUMENTS

| 333629 | 3/1921 | Fed. Rep. of Germany | 248/407 |
| 636325 | 3/1962 | Italy | 297/361 |
| 330234 | 5/1930 | United Kingdom | 292/266 |

Primary Examiner—William E. Lyddane
Attorney, Agent, or Firm—Harness, Dickey & Pierce

[57] ABSTRACT

The disclosure relates to a latch mechanism for controlling reclining movement of a vehicle seat back. A pair of latches are engageable with an articulated slidable link to latch the seat at a desired reclining position. The latches are manually movable to an unlatched condition relative to the link at which time the link is movable therebetween.

3 Claims, 5 Drawing Figures

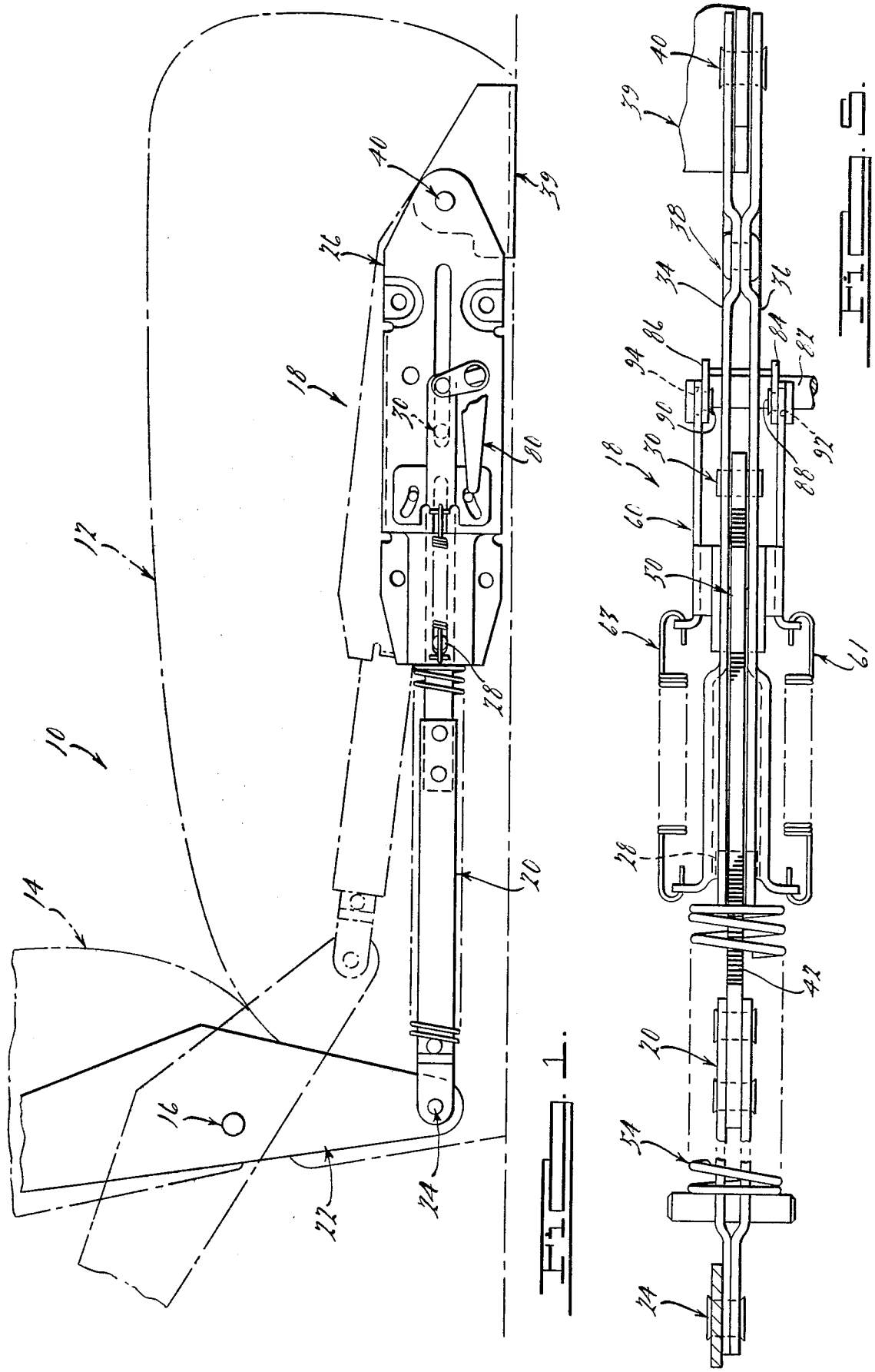

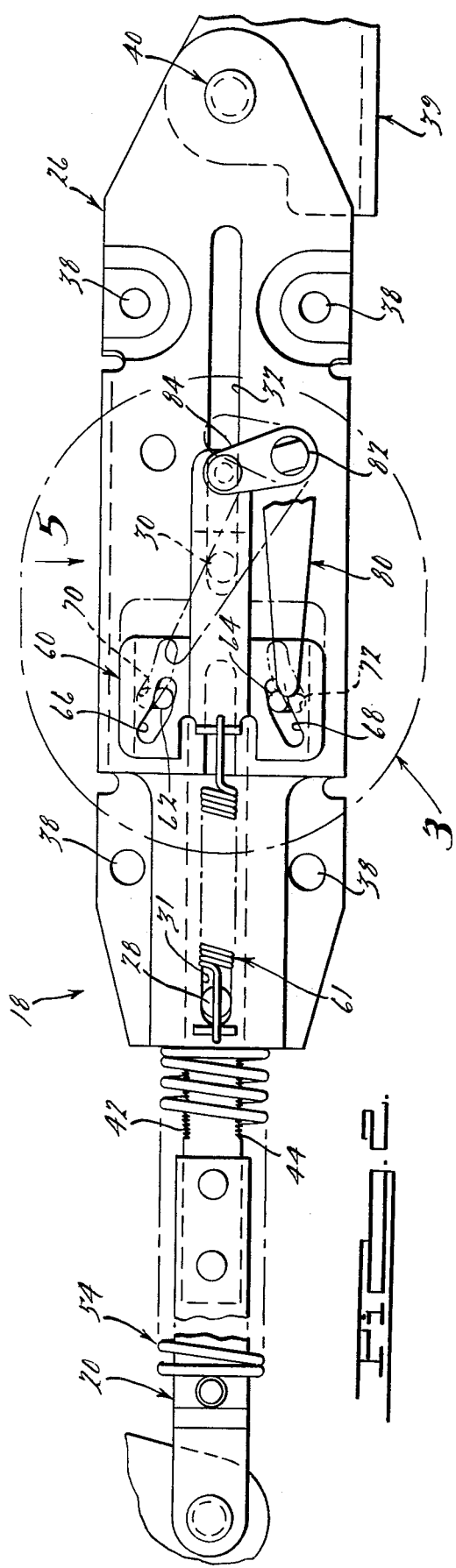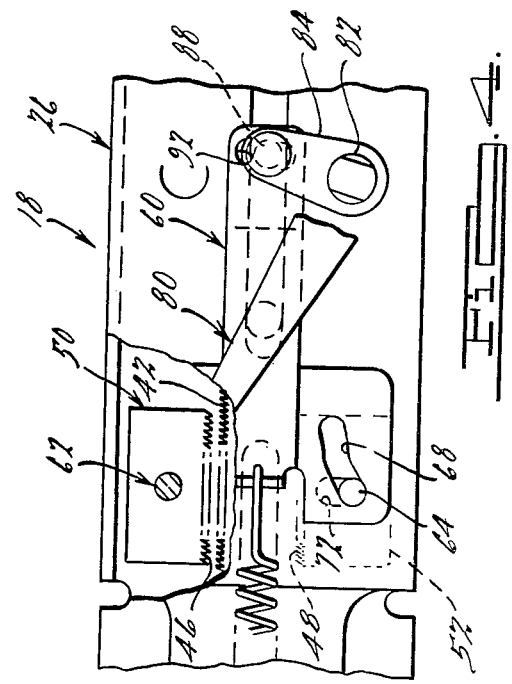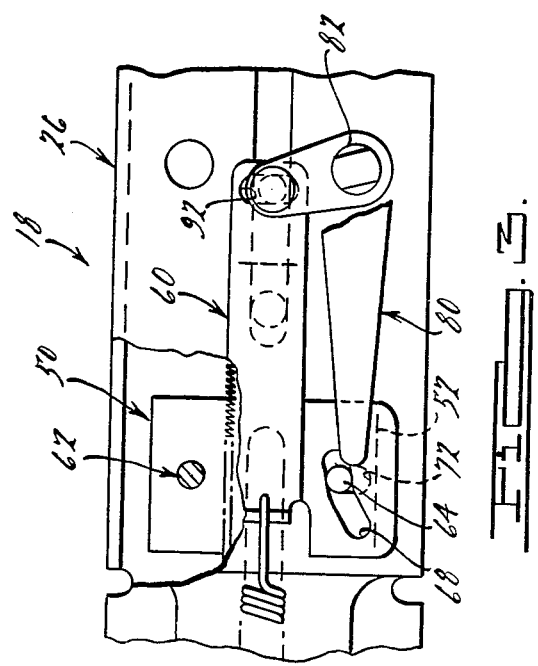

LINEAR CONTROL FOR RECLINING SEAT

BACKGROUND OF THE INVENTION

Manually operated latch mechanisms for retaining a reclinable back of a vehicle seat in a desired position are well known. However, demands of the automotive industry require improvement of such latch mechanisms to render them more positive, more accessible, lighter, and less expensive than previous latch mechanisms.

SUMMARY OF THE INVENTION

A latch mechanism for a vehicle seat in accordance with the instant invention is usable with a vehicle seat having a seat back joined and supported for rotation relative to a seat cushion by a pivot pin. A latch mechanism having a slidable link with oppositely directed teeth thereon is pivotally connected to the seat cushion and to the seat back at a point radially spaced from the pivot pin therebetween so as to be articulated relative thereto. The link portion of the latch mechanism is reciprocable and adjustable relative to a pair of manually controlled latches mounted on the frame of the latch mechanism.

BRIEF DESCRIPTION OF THE DRAWINGS

FIG. 1 is a schematic side elevational view of a vehicle seat embodying the instant invention;

FIG. 2 is an enlarged side elevational view of the latch mechanism of FIG. 1;

FIG. 3 is an enlarged view taken within the circle "3" of FIG. 2 showing the latches and link in the locked condition;

FIG. 4 is a view similar to FIG. 3 showing the latches in the unlatched condition;

FIG. 5 is a view taken in the direction of the arrow 5 of FIG. 2;

DETAILED DESCRIPTION OF THE PREFERRED EMBODIMENT

Referring to the drawings, FIG. 1 shows, in schematic fashion, a vehicle seat assembly 10, incorporating a latch mechanism in accordance with the present invention. The seat assembly 10 is of the type conventionally found in the front seat of motor vehicles and comprises a seat cushion 12 and a seat back 14. The seat back 14 is supported for pivotal movement relative to the seat cushion 12 as by a pin 16 so as to permit the seat back 14 to be pivoted rearwardly to a desired reclining position. A latch mechanism, indicated generally by the reference numeral 18, is provided for controlling reclining movement of the seat back 14 relative to the seat cushion 12.

FIG. 2 shows the latch mechanism 18 in its normal or latched condition denoted by the full line position in FIG. 1.

In accordance with the instant invention, latching of the seat back 14 at a desired reclining position is achieved by latching of a link 20 on the mechanism 18. The link 20 is pivotally connected to a seat back bracket 22 on the seat back 14 by, for example, a pin 24.

The link 20 is journalled for reciprocable movement in a latch mechanism frame 26 by a pair of pins 28 and 30 which are slidably accepted in complementary slots 31 and 32, respectively, in the frame 26. The frame 26 comprises a pair of like plates 34 and 36 (FIG. 5) which are secured to one another as by a plurality of rivets 38.

The frame 26 is pivotally secured to a seat cushion bracket 39 by a pin 40.

The link 20 is provided with oppositely directed teeth 42 and 44 of buttress configuration. As best seen in FIGS. 3 and 4 of the drawings, the teeth 42 and 44 of the link 20 are engageable by complementary teeth 46 and 48, respectively, on a pair of latches 50 and 52, respectively, which, when in the locked condition, preclude movement of the link 20 in either direction relative to the frame 26. A helical compression spring 54 exerts a constant bias on the link 20 outwardly of the frame 26 or, as related to FIG. 1 of the drawings, toward the upright position of the seat back 14.

In accordance with one feature of the instant invention, the latches 50 and 52 are controlled for movement relative to the link 20 by a slidable carrier 60. The carrier 60 is normally biased towards the locked condition by a pair of helical springs 61 and 63 which extend between the carrier 60 and the latch mechanism frame 26.

As best seen by comparing FIGS. 3 and 4, the latches 50 and 52 have transverse pins 62 and 64 therein, respectively, which are slidably accepted in complementary angularly related slots 66 and 68 in the carrier 60. In addition, the pins 62 and 64 are accepted in complementary vertical slots 70 and 72 in the frame 26 which restrict movement of the latches 50 and 52 to reciprocable movement toward and away from the link 20.

Movement of the carrier 60 relative to the frame 26 is controlled by a manual operator 80 which is supported by a shaft 82 journalled in the frame 26. The shaft 82 carries a pair of arms 84 and 86, which in turn carry pins 88 and 90 which are journalled in complementary slots 92 and 94 in the carrier 60.

The carrier 60 is normally biased to the left, as seen in FIG. 2 of the drawings, by the springs 61 and 63, the pins 62 and 64 being biased toward one another due to the slope of the slots 66 and 68, respectively. Since the pins 62 and 64 are journalled in the latches 50 and 52, the teeth 46 and 48 on the latches 50 and 52 are biased into engagement with the teeth 42 and 44 on the link 20 to positively lock the link 20 against movement relative to the frame 26. Since the carrier 60 is supported only by the pins 62, 64, 88 and 90, it essentially "floats" relative to the frame 26 under the bias of the springs 61 and 63. Similarly, the latches 50 and 52 "float" relative to the link 20 so as to be self-positioning relative thereto incident to both locking and unlocking. In this manner the latches 50 and 52 are essentially self-aligning relative to the link 20.

Release of the link 20 for movement relative to the frame 26 is effected by upward movement of the manual operator 80 to the dotted line position shown in FIG. 2 of the drawings. Carrier 60 is moved to the right, as seen in FIG. 2, thereby biasing the pins 62 and 64 and associated latches 50 and 52 upwardly and downwardly, respectively, freeing the link 20 for movement under the bias of the spring 54 or, against the bias of the spring 54 due to the pressure applied to the seat back 14 by an occupant thereof.

While the present invention has been described and illustrated with specific embodiments thereof, it will be appreciated that those skilled in the art, once given the benefit of the foregoing disclosure, may make modifications and variations of the present invention without departing from the spirit thereof and such modifications and variations are to be considered within the scope of the invention which is limited solely by the scope and spirit of the appended claims.

What is claimed is:

1. A latch mechanism for controlling rotation of a vehicle seat back to a reclining position relative to a vehicle seat comprising a link having teeth on opposite faces thereof connectable to said seat back at a point spaced from the axis of rotation thereof relative to said seat, a latch mechanism frame supporting said link for reciprocable movement, said frame having a pair of spaced aligned slots extending at right angles to the axis of reciprocation of said link, a pair of spaced latches having teeth complementary to the teeth on said link, and engageable therewith, respectively, said latches having laterally extending pins thereon slidably acceptable in the slots in said frame, respectively, whereby said latches are guided for movement toward and away from said link to effect engagement and release thereof, a latch carrier supported by said frame and movable relative thereto, said latch carrier having slots therein angularly oriented to the direction of movement thereof for accepting the pins on said latches, respectively, resilient means normally biasing said carrier in a latching direction so as to move said pins toward one another and thereby bias said latches into engagement with said link, and a manual operator supported by said frame and connected to said carrier for moving said carrier in an unlatching direction opposite to said latching direction so as to bias the pins on said latches away from each other and release said link for movement relative to said frame.

2. A latch mechanism in accordance with claim 1, wherein the teeth on opposite sides of said link are of buttress configuration and are oppositely directed whereby said latches effect positive locking of said link against movement in either direction when engaged therewith.

3. A latch mechanism in accordance with claim 1 including spring means extending between said frame and said link for biasing said link away from said frame.

* * * * *